United States Patent
Hirai et al.

(10) Patent No.: US 6,607,845 B2
(45) Date of Patent: Aug. 19, 2003

(54) OPTICAL RECORDING MEDIUM AND OPTICAL RECORDING METHOD

(75) Inventors: Hiroyuki Hirai, Kanagawa (JP); Koukichi Waki, Kanagawa (JP); Takashi Ozawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 48 days.

(21) Appl. No.: 10/011,766

(22) Filed: Dec. 11, 2001

(65) Prior Publication Data

US 2002/0106476 A1 Aug. 8, 2002

(30) Foreign Application Priority Data

Dec. 13, 2000 (JP) ...................................... P2000-378957

(51) Int. Cl.$^7$ ................................................. B32B 3/02
(52) U.S. Cl. ...................... 428/641; 428/64.5; 428/403; 430/270.13
(58) Field of Search ............................... 428/64.1, 64.4, 428/64.5, 64.6, 403, 913; 430/270.13, 495.1, 945

(56) References Cited

U.S. PATENT DOCUMENTS 6,468,620 B2 * 10/2002 Waki ........................ 428/64.1

2002/0006580 A1 * 1/2002 Ishimaru ................ 430/270.11

FOREIGN PATENT DOCUMENTS

JP       10-261244         9/1998

OTHER PUBLICATIONS

Liveri et al, "Synthesis and characterization of ZnS nanoparticles in water/AOT/n–heptane microemulsions", Applied Physics A, vol. 69, pp. 369–373, 1999.

* cited by examiner

Primary Examiner—Elizabeth Mulvaney
(74) Attorney, Agent, or Firm—Sughrue Mion, PLLC

(57) ABSTRACT

A rewritable or write-once medium with increased recording density and sensitivity is disclosed, the medium having at least a first dielectric layer, a recording layer and a second dielectric layer in this order on a substrate, wherein at least one of the first and second dielectric layers is formed by applying a colloidal dispersion which comprises inorganic dielectric nanoparticles having an average particle size of 1 to 50 nm and having the surface thereof modified with an adsorptive compound, and the recording layer is formed by applying a colloidal dispersion which comprises metal chalcogenide nanoparticles having an average particle size of 1 to 20 nm and having the surface thereof modified with an adsorptive compound. The dielectric layer and the recording layer are formed by spin coating or web coating.

11 Claims, No Drawings

OPTICAL RECORDING MEDIUM AND OPTICAL RECORDING METHOD

FIELD OF THE INVENTION

This invention relates to a recording medium, represented by optical discs, using nanoparticles of an inorganic dielectric and nanoparticles of a metal chalcogenide. The terminology "nanoparticles" as used herein refers to ultrafine particles whose average particle size ranges from 1 nm to 50 nm.

BACKGROUND OF THE INVENTION

Optical recording materials have been improved in density and sensitivity. Laser light having a wavelength of 600 nm or longer has been employed for optical recording and reproduction, and optical recording media have conventionally been designed to exhibit their optimal performance within this wavelength region. It is well known that reduction of light wavelength to one-n' th brings a recording density multiplied by $n^2$. Therefore it has been keenly demanded to practically realize high-density recording with a short wavelength laser of about 400 nm. According as the wavelength is shortened for higher recording density, the demands for further increased density and sensitivity of recording media have been increasing.

Relevant technologies using ultrafine particles have hitherto been disclosed as follows. JP-A-5-62239 (The term "JP-A" as used herein means an "unexamined published Japanese patent application") discloses the use of ultrafine particles of semiconductors, such as Ge or Si, which are formed by sputtering and have a particle size distribution. This technique aims at multiple-wavelength recording by making use of difference in quantum size effect of ultrafine particles having different sizes in order to improve recording density without relying on reduction of laser wavelength or increase of numerical aperture (NA). It is therefore fundamentally different from the present invention which takes advantage of the overall phase change of nanoparticles of uniform size in an energy-irradiated area.

JP-A-10-261244 discloses an optical recording medium comprising a substrate having a fine uneven pattern on its surface and a recording layer formed on the patterned substrate by sputtering, in which the recording layer comprises a chalcogen compound having dispersed therein fine metal particles or fine noble metal particles or the recording layer comprises a dielectric material having dispersed therein composite fine particles of a noble metal and a chalcogen compound. Involving the additional step for forming a fine pattern, the technique requires a complicated production process and has poor practicability.

Although thin film formation by sputtering enjoys the merits of a dry process and allows freedom of film composition designing, it has difficulties in controlling the particle size, particle size distribution and structure of the formed particles and also difficulties in forming the particles as dispersed in a binder or a dielectric, as compared with a colloid process. Such difficulties lead to difficulty in improving distinguishability between recorded areas and non-recorded areas, size reduction of the recording area, and stability of the recording material.

As for a technique for preparing ultrafine particles, JP-A-12-54012 discloses a technique of forming magnetic nanocrystals of a metal, an intermetallic compound or an alloy by a reduction process. However, this disclosure is not relevant to the present invention contemplating preparation of a metal chalcogenide. In addition, *Appl. Phys. A,* vol. 69, pp. 369–373 (1999) reports a method of making ZnS nanoparticles, but it does not explicitly mention about applications thereof.

A thin film formed from a material that is included under the scope of the present invention can be formed by CVD as well as sputtering and reduction as noted above. For example, JP-A-2-195538 discloses making a dielectric layer containing ZnS and $SiO_2$ by sputtering. However, where a recording layer is formed by spread coating as in the present invention, it is inefficient to form dielectric layers over and beneath the recording layer by sputtering. Further, formation of an $AgInTe_2$ thin film by CVD is disclosed in JP-A-3-82593. This process requires a substrate to be kept at or above 100° C. Such a high temperature is hardly applicable to a substrate made of polymers such as polycarbonate. It is an additional problem that the film formation by CVD takes time.

The idea that an optical recording layer might be made of a heat-resistant matrix having an ultrafine particulate substance dispersed therein is taught in Japanese Patent 2908826, but the Patent has no mention of a specific process of making such a recording layer. Such a film structure has generally been made by a process comprising injecting a recording material into a heat-resistant matrix in a super-saturated state by sputtering and causing the injected material to precipitate by, for example, annealing. There is no literature teaching a process in which a recording material is made dispersible as a colloid by modifying the surface of ultrafine particles of the material. The Patent also refers to a wet process (a sol-gel process), but fails to disclose any specific process thereof. Accordingly, the description is no more than general one.

JP-A-3-231890 proposes firing after spraying or spin coating to make a recording layer comprising an $InCuSe_2$ alloy, which cannot be seen as practical in view of accuracy of film formation and heat resistance of a substrate.

SUMMARY OF THE INVENTION

It is an object of the present invention to provide a high-density and high-sensitivity recording medium capable of recording, reproducing and erasing information with laser beam irradiation in which a recording layer and dielectric layers are formed by spin coating or web coating with colloidal nanoparticles.

Another object of the invention is to provide a method for optically recording information on the recording medium.

Other objects and effects of the present invention will become apparent from the following description.

The above-described objects of the present invention have been achieved by providing the following recording media and recording method.

1) An optical recording medium comprising a substrate having thereon provided at least a first dielectric layer, a recording layer and a second dielectric layer in this order, wherein at least one of said first dielectric layer and said second dielectric layer is formed by applying a colloidal dispersion which comprises inorganic dielectric nanoparticles having an average particle size of 1 to 50 nm and having a surface modified with an adsorptive compound, and wherein said recording layer is formed by applying a colloidal dispersion which comprises metal chalcogenide nanoparticles having an average particle size of 1 to 20 nm and having a surface modified with an adsorptive compound. The recording layer shows a phase change upon being irradiated to change its optical constant, e.g., a reflectance. It is preferred that both the first and second dielectric layers comprise the inorganic dielectric nanoparticles.

2) The optical recording medium according to item 1) above, wherein said recording layer is formed by a process comprising:

preparing said metal chalcogenide nanoparticles by chemical synthesis in the form of a lipophilic colloidal dispersion; and applying said lipophilic colloidal dispersion.

3) The optical recording medium according to item 1) or 2) above, wherein said metal chalcogenide nanoparticles comprise:

(A) at least one element selected from the elements of the groups 8, 1B and 2B and the elements in the 4th to 6th periods of the groups 3B, 4B and 5B; and (B) at least one element selected from the elements of the group 6B.

4) The optical recording medium according to any one of items 1) to 3) above, wherein said surface-modified inorganic dielectric nanoparticles comprises at least ZnS nanoparticles which has a surface modified with an adsorptive compound.

5) The optical recording medium according to item 4) above, wherein at least one of said first dielectric layer and said second dielectric layer is formed by a process comprising:

preparing said surface-modified ZnS nanoparticles in the form of a colloidal dispersion; and applying said colloidal dispersion.

6) The optical recording medium according to item 5) above, wherein said colloidal dispersion of ZnS nanoparticles comprises ZnS nanoparticles prepared by reacting zinc ions and sulfide ions in an organic solvent having a water content of 10% by volume or less in the presence of said adsorptive compound.

7) The optical recording medium according to item 5) to 6) above, wherein said colloidal dispersion of ZnS nanoparticles is a dispersion in a hydrophilic solvent, said first dielectric layer is formed by applying said hydrophilic dispersion, and said recording layer is formed by applying a lipophilic colloidal dispersion of said metal chalcogenide nanoparticles on said first dielectric layer.

8) The optical recording medium according to any one of items 1) to 7), which is of rewritable type capable of recording, reproducing and erasing information through changes in reflectance of said recording layer, wherein said changes in reflectance is made by irradiating said nanoparticles of the recording layer with first light energy to make them amorphous or irradiating with second light energy having a smaller intensity than said first light energy to make them crystalline.

9) The optical recording medium according to any one of items 1) to 7), which is of write once type capable of recording information through a change in reflectance of said recording layer, wherein said change in reflectance is made by causing an irreversible phase change in, at least one of, the nanoparticles and the vicinities thereof by giving light energy thereto.

10) The optical recording medium according to any one of items 1 to 9, wherein said nanoparticles are mono-dispersed particles having a coefficient of variation of not larger than 30%.

11) An optical recording method comprising irradiating an optical recording medium according to any one of items 1) to 10), with a semiconductor laser beam having an oscillation wavelength ranging from 200 to 900 nm.

DETAILED DESCRIPTION OF THE INVENTION

The optical recording medium of the invention basically has a layer structure composed of substrate/first dielectric layer/recording layer/second dielectric layer/reflective layer/protective layer in this order or a layer structure composed of substrate/reflective layer/first dielectric layer/recording layer/second dielectric layer/protective layer in this order. Each of the dielectric layers and the recording layer may have a multilayer structure. The stack of layers may have a plurality of recording layers as in a layer order of substrate/reflective layer/first dielectric layer/first recording layer/second dielectric layer/semi-transparent reflective layer/third dielectric layer/second recording layer/fourth dielectric layer/protective layer. A pair of stacks may be joined with the substrates inside to provide a double-sided recording structure.

The nanoparticles which can be used in the invention have an average particle size of 1 to 50 nm, preferably 1 to 20 nm, still preferably 1 to 10 nm. Particles greater than 50 nm have an increased melting point, which results in reduction of phase change rate in the recording layer. Such greater particles, when used in the dielectric layer, not only result in a reduction of heat conduction rate but also impair uniformity of the recording layer formed thereon. The lower limit of the particle size is decided according to the practical performance requirements such as weatherability. It is preferred that the nanoparticles be mono-dispersed particles for securing distinguishability between recorded areas and non-recorded areas. The "mono-dispersed" particles preferably have a particle size distribution with a coefficient of variation of 30% or smaller, still preferably 20% or smaller, particularly preferably 10% or less.

In order to obtain the dielectric layer(s) and the recording layer of the invention, which comprise a nanoparticle dispersion, it is important to modify the surface of the nanoparticles with an adsorptive compound. The term "adsorptive compound" as used herein denotes a compound having a group capable of being adsorbed. Effective adsorptive compounds include alkylphosphine oxides, alkylphosphines, and compounds containing —SH, —CN, —NH$_2$, —SO$_2$OH, —SOOH, —OPO(OH)$_2$ or —COOH, with alkylphosphine oxides, —SH-containing compounds, and —COOH-containing compounds being preferred. Anionic surface active agents are also useful as an adsorptive compound. In preparing a lipophilic dispersion, adsorptive compounds having a substituent(s) containing, in total, 6 or more, preferably 8 to 40, carbon atoms (e.g., octyl, decyl, dodecyl, hexadecyl, etc.) are preferably used. In preparing a hydrophilic dispersion, adsorptive compounds having a substituent containing 6 or less carbon atoms or a hydrophilic group (e.g., —SO$_3$M or —COOM (M: H, an alkali metal, an ammonium molecule, etc.)) are preferably used. A thin film formed by such surface-modified fine particles (i.e., a thin film formed by agglomeration of dispersed particles) can never be obtained by sputtering or vacuum deposition techniques.

The surface modification of the nanoparticles with an adsorptive compound can be confirmed by the fact that there is a given interval among the particles as observed under a high-resolving power TEM such as FE-TEM and also through chemical analyses.

The nanoparticle colloid in the present invention is applied by spin coating or web coating. Compared with dry processes, such wet coating realizes reduction in plant investment and production cost.

The metal chalcogenides which can be used to make the recording layer comprise (A) at least one element selected from the elements of the groups 8, 1B and 2B and the elements in the 4th to 6th periods of the groups 3B, 4B and 5B and (B) at least one element selected from the group 6B elements (i.e., O, S, Se, Te and Po). Examples of the metal chalcogenides include GeSbTe, AgInSbTe, GeTe, $Ag_2Te$, $AgInTe_2$, $AgSbTe_2$, $CuInSe_2$, $CuInTe_2$, AgSbTe, InSbTe, GeTeS, GeSeS, GeSeSb, GeAsSe, InTe, SeTe, SeAs, GeTeAu, GeTeSeSb, GeTeSnAu, GeTePb, and GeTeSbS. In particular, GeSbTe, AgInSbTe, GeTe, $Ag_2Te$, $AgInTe_2$, $AgSbTe_2$, $CuInSe_2$ or $CuInTe_2$ is preferred. While the atomic ratios in the above chemical formulae are represented by integers, they may be deviated from integer ratios so as to modify the recording characteristics, archival stability, strength, and the like as desired.

The metal chalcogenide nanoparticles can be synthesized by adding precursor solutions, separately containing the element (A) and the element (B) in the form of ultrafine particles of a simple substance or its salt in an alkylphosphine, etc., to a high-boiling organic solvent, such as an alkylphosphine oxide, and reacting the precursors at a temperature ranging from 100° C. to 350° C. The term "precursor" as used herein means a reactive substance containing the element(s) which is/are necessary to form the metal chalcogenide. In the reaction, a precursor containing the element(s) (A) and a precursor containing the element(s) (B) are used.

The alkylphosphine includes symmetric tertiary phosphines, such as tributylphosphine, trioctylphosphine, and triphenylphosphine; asymmetric phosphines, such as dimethylbutylphosphine and dimethyloctylphosphine; and mixtures thereof. Preferred of them are tributylphosphine (TBP) and trioctylphosphine (TOP). These alkylphosphines may have appropriate functional groups (the examples of which are described below with respect to hydrocarbons solvents) on their alkyl groups.

The high-boiling organic solvents include alkylphosphine oxides, straight-chain or branched hydrocarbons (usually having 8 to 22 carbon atoms) or fluorocarbons, having a functional group modifying the surface of the nanoparticles (e.g., —SH, —$SO_2OH$, —SOOH, —$OPO(OH)_2$, —COOH). In addition, didecyl ether, didodecyl ether, phenyl ether, and n-octyl ether are also preferably used. The alkylphosphine oxides include tributylphosphine oxide, trioctylphosphine oxide (TOPO), and dibutyloctylphosphine oxide, with TOPO being the most preferred.

The reaction between the solution of a precursor containing the element(s) (A) and the solution of a precursor containing the element(s) (B) in the above-specified temperature range (100 to 350° C.) is preferably carried out in an inert gas atmosphere. The total number of moles of the elements (B) is preferably 0.001% to 0.5%, still preferably 0.005% to 0.2%, based on the weight of the high-boiling organic solvent. Where the reaction temperature is lower than 100° C., or where the element (B) concentration is lower than 0.001%, the reaction tends to have a very low rate in particle formation or tends to fail to form nanoparticles. At higher temperatures or in higher concentrations, coarse particles tend to be formed, or the formed particles tend to aggregate, resulting in a failure to re-disperse.

The nanoparticles thus formed in the reaction mixture are precipitated and flocculated by addition of a flocculent. Methanol or ethanol is usually added as the flocculent. The supernatant liquor is removed by decantation, and the resulting nanoparticles are re-dispersed in a solvent, such as an aprotic hydrocarbon (e.g., n-hexane). The surface modifier for the nanoparticles, i.e., the adsorptive compound can be added to the preparation system in any stage of from the nanoparticle formation up to the purification of the particles.

It is preferred that the metal chalcogenide nanoparticles be crystalline. In most cases, the above-described reaction system provides fine crystals. This is of extreme significance for reducing the number of steps involved and the cost incurred in the production of optical recording media, as is recognized from the fact that JP-A-8-221814 (corresponding to U.S. Pat. No. 5,627,012) proposes an optical recording material which is formed into a film by sputtering and calls for no initialization (crystallization). Where the nanoparticles obtained have insufficient crystallinity, they can be initialized with a bulk laser as is well known in the art.

While related to the particle size of the ultrafine particles, the thickness of the recording layer can range from 5 to 300 nm, usually from 5 to 200 nm, preferably from 5 to 100 nm, still preferably from 5 to 50 nm. The recording layer can contain non-decomposing organic binders, such as fluorine-containing polymers or silicone polymers, or nanoparticles of dielectric substances, such as ZnS, $SiO_2$, and $TiO_2$, to improve the physical strength or durability to repetition of overwriting and retrieving.

At least one of the dielectric layers used in the present invention comprises inorganic dielectric nanoparticles having the surface thereof modified with an adsorptive compound. Examples of the inorganic dielectrics includes ZnS, $SiO_2$, $TiO_2$, $Al_2O_3$, AlN, SiC, silicon nitride, $MgF_2$, $CaF_2$, LiF, SiO, $Si_3N_4$, ZnO, MgO, CeO, SiC, ZrO, $ZrO_2$, $Nb_2O_5$, $SnO_2$, $In_2O_3$, TiN, BN, ZrN, $In_2S_3$, $TaS_4$, MgS, CaS, TaC, $B_4C$, WC, TiC, and ZrC. It is particularly preferred to use at least ZnS nanoparticles for facilitating preparation of a colloidal dispersion. ZnS nanoparticles can be used in combination with $SiO_2$, $TiO_2$, $Al_2O_3$, ZnO, $MgF_2$, $CaF_2$, LiF, SiO, etc. A mixture of ZnS nanoparticles and $SiO_2$ nanoparticles is the most preferred.

ZnS nanoparticles having the surface thereof modified with an adsorptive compound can be obtained by mixing a solution of a zinc salt (e.g., zinc sulfate, zinc acetate, zinc nitrate, zinc hydrochloride, etc.) and a solution of a sulfide (e.g., sodium sulfide, potassium sulfide, ammonium sulfide, etc.) in the presence of the above-recited adsorptive compound. For reducing the size of the ZnS particles, it is desirable that the water content of the reaction solvent be as small as possible, for example 10% by weight or less, particularly 5% by weight or less. In order to remove by-produced salts or an excess of the adsorptive compound, the particles may be collected by centrifugation and re-dispersed in a lipophilic or hydrophilic dispersing medium. The adsorptive compound to be used may be different between the case where the re-dispersion is made with a lipophilic dispersing medium and the case where made with a hydrophilic dispersing medium. An aqueous dispersion of ZnS nanoparticles can be obtained by forming ZnS nanoparticles in the manner described above with using a water-immiscible solvent (e.g., n-heptane, n-octane, isooctane, 3-methylheptane, ethyl acetate or methyl ethyl ketone) as a reaction medium, mixing the reaction mixture with water containing a water-soluble adsorptive compound, and separating the aqueous phase by liquid-liquid separation.

Various kinds of nanoparticle dispersions of $SiO_2$, $TiO_2$, $Al_2O_3$, ZnO, etc. are available in the market, which can be used in the present invention. Where ZnS and the above-described inorganic dielectric are used in combination, the mixing ratio is appropriately selected according to the desired physical properties but is preferably 98:2 to 20:80 by weight.

The first and the second dielectric layers each preferably have a thickness of 10 to 200 nm. Where write/retrieve light is incident on the substrate side, the first dielectric layer and the second dielectric layer preferably have a thickness of 30 to 150 nm and 10 to 100 nm, respectively. Where write/retrieve light is incident on the opposite side (i.e., the protective layer side), the first dielectric layer and the second protective layers preferably have a thickness of 10 to 100 nm and 30 to 150 nm, respectively.

The reflective layer can be made of a single metal substance having a high reflectance, such as Au, Ag, Al, Pt or Cu, or an alloy comprising one or more of these metals. It is preferred that the reflective layer mainly comprises Ag, Al or an Ag— or Al-based alloy. The thickness of the reflective layer is preferably 30 to 300 nm, still preferably 50 to 200 nm. The material used to form the reflective layer can also be formed into a nanoparticle colloidal dispersion, which is applied by wet coating.

The material used in the protective layer includes inorganic substances, such as SiO, $SiO_2$, $MgF_2$, $SnO_2$, and $Si_3N_4$, and organic substances, such as thermoplastic resins, thermosetting resins and ultraviolet (UV)-curing resins. The protective layer is preferably made of a resin(s). A heat-insulating protective layer may be provided between the recording layer and the reflective layer.

The protective layer can be provided by superposing a separately prepared film, for example, an extruded plastic film, on the reflective layer and/or the substrate via an adhesive layer. Alternatively, the protective layer can be provided by, for example, vacuum deposition, sputtering or wet coating. In the case of using a thermoplastic resin or a thermosetting resin as a protective material, the protective layer can also be formed by applying a coating solution of the resin, which is prepared by dissolving the resin in an appropriate solvent, followed by drying to remove the solvent. In the case of using a UV-curing resin, it is applied as such or as dissolved in an appropriate solvent followed by UV irradiation to form a cured resin protective layer. If desired, the coating composition for the protective layer may contain various additives such as antistatic agents, antioxidants and UV absorbers. Where a write/retrieve light is incident on the substrate side, the protective layer preferably has a thickness of 0.1 to 100 $\mu$m, more preferably 1 to 50 $\mu$m, particularly preferably 2 to 20 $\mu$m. Where write/retrieve light is incident on the opposite side (i.e., the protective layer side), the protective layer preferably has a thickness of 1 to 300 $\mu$m, more preferably 10 to 200 $\mu$m, particularly preferably 50 to 150 $\mu$m.

There is thus prepared an optical recording medium having, on the substrate, the recording layer, the dielectric layers and, if desired, the reflective layer, the protective layer, etc. A pair of the recording media can be laminated via an adhesive, etc., with their recording layers inside relative to the respective substrate, to give an optical recording medium having two recording layers. Alternatively, the recording medium can be laminated with a protective disc of substantially the same size via an adhesive, etc., with the recording layer inside relative to the substrate, to prepare an optical recording disc having a recording layer on one side thereof. The lamination can be effected with a UV-curing resin useful as the protective layer or any synthetic adhesive. A double-sided adhesive tape is also useful. The adhesive layer usually has a thickness of 0.1 to 100 $\mu$m, preferably 5 to 80 $\mu$m.

The optical recording medium having the constitution of the invention is applicable as not only a rewritable medium but also a write once type medium. The structure of the write once recording media may be conventional one, except that the nanoparticles of the invention are used in the recording layer and the dielectric layer(s).

It is convenient for information management to label an optical recording medium with a title or a design indicating the contents of the recorded information. For this purpose, the side of the recording medium opposite to the light-incident side should have a surface fit for such labeling. In recent years, ink jet printers are commonly used for printing labels. When a surface of an optical recording medium is to be printed on an ink jet printer, the surface is required to be hydrophilic because ink jet printers use aqueous ink. Generally having a hydrophobic surface, the surface of the optical recording medium to be printed must be subjected to a surface treatment to get hydrophilic, i.e., ink-receptive. The surface of the medium can be rendered hydrophilic by UV-ozone irradiation or an oxygen plasma treatment. Various proposals have been made as for optical recording media with a hydrophilic printable surface layer as disclosed, e.g., in JP-A-7-169700 and JP-A-10-162438. Such a hydrophilic surface layer can be provided on the optical recording medium of the invention. It is advantageous that the hydrophilic surface layer is formed of a layer comprising a UV-curing resin (a binder) having dispersed therein particles of hydrophilic organic polymers, such as protein particles.

The media of the invention achieves high-density recording with light having a wavelength selected from a range of 200 nm to 900 nm. The medium is particularly suitable for recording with a bluish purple laser beam and a laser beam modulated with a second harmonic generation (SHG) element to have a shorter wavelength.

The present invention will be illustrated in greater detail with reference to the following Examples, but the invention should not be construed as being limited thereto.

EXAMPLE 1

Preparation of $Ag_2Te$ Nanoparticle Colloid

Te was dissolved in TOP to prepare a 1M solution (hereinafter Te-TOP). AgCl was dissolved in TOP to prepare a 1M solution (hereinafter Ag-TOP). In an inert gas atmosphere 100 g of TOPO was melted by heating at 140° C., and 20 ml of Ag-TOP and 10 ml of Te-TOP were added thereto while vigorously stirring (Te content in TOPO: 0.01 mol %). The reaction was continued for 20 minutes with vigorous stirring. The resulting $Ag_2Te$ nanoparticles had an average particle size of 8 nm, and the coefficient of size variation was as astonishingly small as 5%. Adsorption of TOPO onto the particle surface was confirmed by the fact that there was a given interval among the particles under high-resolving power TEM observation and also through chemical analyses.

EXAMPLE 2

Preparation of $AgInTe_2$ Nanoparticle Colloid $InCl_3$ was dissolved in TOP to prepare a 1M solution (hereinafter In-TOP). In an inert gas atmosphere 100 g of TOPO was melted by heating at 150° C., and 67 ml of In-TOP and 100 ml of Te-TOP (the same as in Example 1)

were added thereto while vigorously stirring, followed by stirring for about 1 hour. To the reaction mixture were added 67 ml of Ag-TOP (the same as in Example 1) and 34 ml of Te-TOP, and the mixture was allowed to react for about 10 minutes (Te content in TOPO: 0.13 mol %). The resulting $AgInTe_2$ nanoparticles had an average particle size of 6 nm, and the coefficient of size variation was 7%. One liter of methanol was added to the reaction mixture to flocculate the particles, which were collected and re-dispersed in 100 ml of toluene. Flocculation and re-dispersion were repeated several times to complete purification. After drying, the particles were dispersed in n-hexane to prepare a dispersion having a concentration of 0.5 g/ml. It was confirmed that the nanoparticles obtained above had TOPO adsorbed on the surface thereof in the same manner as in Example 1.

EXAMPLE 3

Preparation of ZnS Nanoparticle Colloid $ZnSO_4 \cdot 7H_2O$ (5.7 g), 8.9 g of sodium 1,2-bis(2-ethylhexyloxycarbonyl)ethanesulfonate (hereinafter, AOT), 6 ml of water, and 120 ml of n-heptane were mixed and dissolved to prepare solution I. $Na_2S \cdot 9H_2O$ (4.8 g), 8.9 g of AOT, 6 ml of water, and 120 ml of n-heptane were mixed and dissolved to prepare solution II.

Solution II was slowly added to solution I while stirring. The mixture was transferred to a separatory funnel, and a solution of 0.4 g of sodium 3-mercapto-1-propylsulfonate in 10 ml of methanol and 100 ml of water was added thereto, followed by shaking. After liquid-liquid separation, the aqueous layer was concentrated by evaporation to obtain a colloidal dispersion containing 1 wt % of ZnS nanoparticles (average particle size: 12 nm with a coefficient of variation of 9%; hereinafter, ZnS—W). The heptane phase was concentrated to dryness by evaporation, and the solid was re-dispersed in dodecane to prepare a colloidal dispersion containing 2 wt % of ZnS nanoparticles (average particle size: 9 nm with a coefficient of variation of 7%; hereinafter, ZnS—O). It was confirmed by the same analyses as in Example 1 that the nanoparticles obtained had the dispersant adsorbed on the surface thereof.

EXAMPLE 4

Preparation of Coating Composition of Dielectric Layer

One milliliter of $SiO_2$ hydrosol (Snowtex XT-S, available from Nissan Chemical Industries, Ltd.) was mixed into 10 ml of the ZnS colloidal dispersion ZnS—W obtained in Example 3 to prepare coating composition A for a dielectric layer ($ZnS/SiO_2 = 5/3$ by weight). One milliliter of $SiO_2$ organosol (IPA-ST, available from Nissan Chemical Industries, Ltd.) was mixed into 10 ml of the colloidal dispersion ZnS—O obtained in Example 3 to prepare coating composition B for a dielectric layer ($ZnS/SiO_2 = 10/3$ by weight).

EXAMPLE 5

Preparation of Optical Disc

A stack of layers shown in Table 1 below was formed on a polycarbonate (PC) disc having a diameter of 120 mm and a thickness of 0.6 mm. In Table 1, (S) means that the layer was formed by sputtering, and (C) means that the layer was formed by spin coating. Where a dielectric layer was spin-coated with hydrophilic coating composition A, the surface to be coated had previously been rendered hydrophilic by UV-ozone irradiation.

TABLE 1

| Sample No. | 1 | 2 | 3 | 4 | 5 |
|---|---|---|---|---|---|
| Remark | Comparison | Comparison | Invention | Invention | Invention |
| Protective Layer | UV-curing resin (C) → UV irradiation (200 nm) | | | | |
| Reflective Layer | Ag (S) (160 nm) | | | | |
| Second Dielectric Layer | $ZnS/SiO_2 = 3/1$ (S) (20 nm) | | Composition A (C) (20 nm) | Composition B (C) (20 nm) | |
| Recording Layer | $AgInTe_2$ (S) (20 nm) | | $AgInTe_2$ (C) (20 nm) | | $Ag_2Te$ (C) (20 nm) |
| First Dielectric Layer | $ZnS/SiO_2 = 3/1$ (S) (80 nm) | | Composition A (C) (80 nm) | | Composition B (C) (80 nm) |
| PC Substrate | (0.6 mm) | | | | |

*) The numerical values in the parentheses represent the respective layer thickness

EXAMPLE 6

Evaluation of Optical Discs

The recording characteristics of the optical recording media obtained in Examples 5 (samples 1 to 5) were evaluated as follows by use of an optical disc testing drive DDU1000, supplied by Pulstec Industrial Co., Ltd. The recording layer as formed was partly crystalline so that it was irradiated with laser light of 4 to 10 mW to sufficiently crystallize (initialization). Test signals having a frequency of 4.35 MHz were recorded by irradiating the substrate side of the disc with a laser beam having a wavelength of 405 nm by using an optical pickup having a numerical aperture (NA) of 0.6 at a linear velocity of 3.5 m/sec and a duty ratio of 33%. The write power was stepwise increased by 1 mW up to 12 mW. The recorded signals were retrieved at 0.7 mW. The write power (Pw), with which a C/N ratio reached saturation or the maximum, the optimum erase power ($P_E$), and the erasure ratio were determined. In addition, the minimum output which enabled recording was also determined. The results are shown in Table 2.

TABLE 2

| Sample No. | Minimum Output for Writing (mW) | $P_W$ (mW) | $P_E$ (mW) | C/N (dB) | Erasure Ratio (-dB) |
|---|---|---|---|---|---|
| 1 (Comparison) | 12 | 16 | 10 | 39 | 35 |
| 2 (Comparison) | 6 | 10 | 7 | 43 | 36 |
| 3 (Invention) | 3 | 8 | 4 | 45 | 38 |
| 4 (Invention) | 3 | 7 | 5 | 44 | 38 |
| 5 (Invention) | 4 | 8 | 4 | 44 | 37 |

As is apparent from Table 2, the recording media of the invention in which not only the recording layer but the dielectric layers are formed by coating with the respective dispersion of colloidal nanoparticles are recordable with a lower laser output, i.e., more sensitive than the comparative media formed by sputtering. The recording media of the invention also prove to require extremely low $P_W$ and $P_E$ and provide satisfactory C/N and erasure ratios.

Further, signals of different frequencies (f1=4.34 MHz; f2=5.1 MHz) were alternately overwritten on the discs of the invention. After 1000 overwrite cycles in total, the C/N ratio and the erasure ratio were measured. As a result, every sample showed some reduction but still retained satisfactory levels of C/N and erasure ratios.

The present invention provides an optical recording medium having a recording layer and a dielectric layer(s) each made of nanoparticles and therefore exhibiting improved sensitivity over optical recording media produced by conventional methods.

While the invention has been described in detail and with reference to specific examples thereof, it will be apparent to one skilled in the art that various changes and modifications can be made therein without departing from the spirit and scope thereof.

What is claimed is:

1. An optical recording medium comprising a substrate having thereon provided at least a first dielectric layer, a recording layer and a second dielectric layer in this order, wherein at least one of said first dielectric layer and said second dielectric layer is formed by applying a colloidal dispersion which comprises inorganic dielectric nanoparticles having an average particle size of 1 to 50 nm and having a surface modified with an adsorptive compound, and wherein said recording layer is formed by applying a colloidal dispersion which comprises metal chalcogenide nanoparticles having an average particle size of 1 to 20 nm and having a surface modified with an adsorptive compound.

2. The optical recording medium according to claim 1, wherein said recording layer is formed by a process comprising:

preparing said metal chalcogenide nanoparticles by chemical synthesis in the form of a lipophilic colloidal dispersion; and applying said lipophilic colloidal dispersion.

3. The optical recording medium according to claim 1, wherein said metal chalcogenide nanoparticles comprise:

(A) at least one element selected from the elements of the groups 8, 1B and 2B and the elements in the 4th to 6th periods of the groups 3B, 4B and 5B; and (B) at least one element selected from the elements of the group 6B.

4. The optical recording medium according to claim 1, wherein said surface-modified inorganic dielectric nanoparticles comprises at least ZnS nanoparticles which has a surface modified with an adsorptive compound.

5. The optical recording medium according to claim 1, wherein at least one of said first dielectric layer and said second dielectric layer is formed by a process comprising:

preparing said surface-modified ZnS nanoparticles in the form of a colloidal dispersion; and applying said colloidal dispersion.

6. The optical recording medium according to claim 5, wherein said colloidal dispersion of ZnS nanoparticles comprises ZnS nanoparticles prepared by reacting zinc ions and sulfide ions in an organic solvent having a water content of 10% by volume or less in the presence of said adsorptive compound.

7. The optical recording medium according to claim 5, wherein said colloidal dispersion of ZnS nanoparticles is a dispersion in a hydrophilic solvent, said first dielectric layer is formed by applying said hydrophilic dispersion, and said recording layer is formed by applying a lipophilic colloidal dispersion of said metal chalcogenide nanoparticles on said first dielectric layer.

8. The optical recording medium according to claim 1, which is of rewritable type capable of recording, reproducing and erasing information through changes in reflectance of said recording layer, wherein said changes in reflectance is made by irradiating said nanoparticles of the recording layer with first light energy to make them amorphous or irradiating with second light energy having a smaller intensity than said first light energy to make them crystalline.

9. The optical recording medium according to claim 1, which is of write once type capable of recording information through a change in reflectance of said recording layer, wherein said change in reflectance is made by causing an irreversible phase change in, at least one of, the nanoparticles and the vicinities thereof by giving light energy thereto.

10. The optical recording medium according to claim 1, wherein said nanoparticles are mono-dispersed particles having a coefficient of variation of not larger than 30%.

11. An optical recording method comprising irradiating an optical recording medium according to claim 1, with a semiconductor laser beam having an oscillation wavelength ranging from 200 to 900 nm.

* * * * *